United States Patent Office 3,102,100
Patented Aug. 27, 1963

3,102,100
PROCESS FOR EMULSIFICATION AND DEMULSIFICATION BY SURFACTANTS AND THE RECOVERY THEREOF
Harold L. Greenwald, Levittown, Pa., assignor to Rohm & Haas Company, Philadelphia, Pa., a corporation of Delaware
No Drawing. Filed Sept. 15, 1958, Ser. No. 760,935
2 Claims. (Cl. 252—303)

This invention relates to a novel process for forming and resolving or separating oil-water type emulsions. It is especially significant because it also provides for the reclamation and reuse of the emulsifying agent.

There are numerous areas in which the invention is applicable. One is the recovery operation in oil production which is considerably improved by the use of my novel process. Others will be described below.

Broadly stated, the object of my invention is to provide an efficient method for forming oil-water type emulsions, for breaking those emulsions quite readily and efficiently, and for recovering most of the emulsifying agent in such condition that it is suitable for reuse.

A more specific object is to provide a process for effecting the recovery of oil by means of either a type of water-flooding operation or a strip-mining operation in both of which an aqueous surfactant solution is employed to accomplish the oil recovery, and for recovering and re-using most of the surfactant so used.

Another object is to provide a process for the recovery of oil by the use of an aqueous surfactant solution which causes an oil-water emulsion to be produced, said emulsion being readily and inexpensively broken so that the surfactant can be efficiently recovered in a single phase and reused and the oils economically obtained.

Other objects of the invention, together with some of the advantageous features thereof, will appear from the following description and specification. In most cases, recovery of the surfactant will be a principal feature; however, the invention is not necessarily limited thereto as in certain applications it will be useful only to emulsify and demulsify in accordance with the novel methods herein described.

Many agents have been proposed for emulsifying and demulsifying oils. But in certain applications notably in the recovery of oil from various unusual petroluem-bearing formations, such as tar sands, these agents have proven unsatisfactory for one reason or another. Among the principal objections are the use of relatively costly emulsifying materials which are substantially non-recoverable, the difficulty in forming the emulsions, the difficulty in breaking the emulsions, etc.

The present invention overcomes all of these objections by the novel use of certain surfactants in the emulsification-demulsification procedures which make possible high recovery of all components by controllably changing the hydrophile-lipophile balance of a surfactant during the process. (The terms "surfactant" and "emulsifier" or "emulsifying agent" as hereinafter employed may be used interchangeably.) The controlled change of this balance is brought about by the use of pH-sensitive emulsifiers: The oil is either emulsified under alkaline conditions and the emulsion later broken by adding acid to make the solution acidic, or emulsified under acid conditions and broken by adding alkali to make the solution alkaline. In actual practice, it may be desirable in some cases to effect a closer control of the acidity of alkalinity of the treated solution in order to maximize the recovery of surfactant. This variation of pH effectively controls emulsion stability and the concentration of the surface-active agent in each phase. In my process, when stability of the emulsion is rendered a minimum, recovery of the surfactant for reuse is facilitated either by preferential solubility of the surfactant in the organic or the aqueous phase or by precipitation of the surfactant. My invention may thus be practiced in three alternative procedures which may conveniently be grouped as follows:

CATEGORY A (1) Make oil-water emulsion by means of a surfactant
(2) Recover surfactant in *aqueous* phase by suitable control of pH in both steps

CATEGORY B (1) Make oil-water emulsion by means of a surfactant
(2) Recover surfactant in *organic* phase by suitable control of pH in both steps

CATEGORY C (1) Make oil-water emulsion by means of a surfactant
(2) Recover surfactant as a *precipitate* by suitable control of pH in both steps As indicated earlier, and as will be explained in more detail below, the emulsions formed in each of the above categories may optionally be made in a base and broken with an acid, or vice versa.

Ordinarily, in emulsions, appreciable fractions of the total emulsifier are found in three locations: (1) the bulk oil phase; (2) the bulk aqueous phase; and (3) in the region of the interface. In my invention, I not only destroy the emulsion, but also I effect a concentration of the surfactant in one bulk phase or the other as I choose. This choice is made dependent on the contemplated mode of reuse of the surfactant or of the surfactant solution. In some cases, I may choose to concentrate a surfactant as a separate, pure—or almost pure—phase for convenience in reuse. This ability to concentrate, in one phase, a good emulsifier which otherwise is spread over three locations as above explained, is a novel as well as highly useful feature of my invention.

EXAMPLES OF PROCESS EMPLOYING SINGLE CYCLE

Not all surfactants will work in my novel process and, of those that do work, not all of them will function satisfactorily in each of the three categories described above. The selection and manner of employment of the various surfactants are, therefore, important to the successful practice of the invention. In essence, it may be stated that any surfactant having weakly acidic or weakly basic groups will work in one or more of the systems encompassed by my invention. The surfactants which will not work efficiently are those whose hydrophilic portion is entirely (a) non-ionic, or (b) composed of the anion of a strong acid or of the cation of a strong base.

In the numerous examples which were conducted to demonstrate the operation of the invention, the starting solutions employed were divided into two main sets. One set was a 0.5 percent solution of the surfactant in 0.5 percent NaOH, and the other set was a 0.5 percent solution of the surfactant in 0.5 percent $H_2SO_4$. However, in order to demonstrate effectiveness at different concentrations, several experiments were run in which the initial surfactant concentration ranged from 0.05 to 20 percent.

Equal volumes of the oil and of the surfactant-caustic or of the surfactant-acid solution (as the case may be) were placed in each of two screw-cap jars and agitated on a reciprocating type shaker for 15 minutes. The emulsified contents of one jar were poured into a graduated cylinder and allowed to stand for one hour, at which time the volumes of the various phases were recorded and the percent recovery of the aqueous phase (a measure of emulsion instability) computed. To the contents of the other jar either acid or base was added until the pH was rendered below about 5 in the ones which were made acidic and above around 9 in the ones which were made alkaline. After a complete breaking of the emulsion, or after one hour, whichever was earlier, the volumes of the organic and aqueous phases, respectively, were recorded. Suitable surfactants for the particular oil-water system gave low instability in the first jar and high instability in the second jar. The emulsion instability one hour after adding the acid or base was computed and reported as the percent recovery of the aqueous phase.

For any surfactant having weakly acidic or weakly basic groups, oil-water systems will be found in which my invention will operate efficiently. Conversely, for any given oil-water system, surfactants of this type exist which will work efficiently. It is well known in the art that the hydrophile-lipophile balance of an emulsifier determines its effectiveness for a given oil-water system. Thus, the well-known techniques for choosing a good emulsifier are to be applied to the classes containing weakly acidic or weakly basic groups as a preliminary step in the practice of my invention. This was done as described in the following paragraphs.

All the tests were conducted at room temperature. The pH was checked at two or more points in each case. The surfactants which formed a relatively stable emulsion in base were deemed to be useful in the processes of all three categories, A, B, and C, previously described, particularly the processes in which the oil was emulsified in base and broken with acid. High, low, or moderate recovery of the surfactant in the aqueous phase determined whether the surfactant belonged in category A or B or failed to qualify. If a high percentage of the surfactant precipitated upon acidification, the surfactant qualified for category C. The same principles were used in determining the utility of surfactants for the processes in each of the three categories in which the oil was emulsified in acid and broken with base, except that the direction along the pH scale was reversed.

The above-described tests involved in a single cycle process, and the data obtained thereby are represented in Tables 1, 2, 3, and 4. Other experiments were run with a recycling process, which will be described in detail below, and the data obtained thereby are represented in Tables 5, 6, and 7. In almost all of the examples, the oils used were toluene and "Ventura" crude oil (a relatively "clean" crude oil). Six other oils (i.e., organic liquids which are insoluble in water) were used to test the efficiency of the invention under various conditions making a total of eight as follows:

(1) Toluene
(2) Ventura crude oil
(3) Howard Glasscock crude oil
(4) Hawkins Field crude oil
(5) Wesson oil (cottonseed oil)
(6) Di-butyl sebacate
(7) Di-octyl sebacate
(8) Mixture of lauryl and myristyl alcohols NOTE—Nos. 2, 3, and 4 represent oils that are well known by those names to persons familiar with the petroleum field. No. 5 is a well-known commercial product sold under that name. No. 8 is a commercially available mixture sold under a trade name.

The results obtained with the single cycle process are set forth in Tables 1–4.

*Table 1*

EMULSIFIED IN CAUSTIC, BROKEN WITH ACID; SURFACTANT RECOVERED IN AQUEOUS PHASE

Organic phase: Toluene
Aqueous phase: Surfactant, 0.5% NaOH, deionized $H_2O$ (all pH's: 12.8–13.1)

| Surfactant | Mole ratio of EO (n)[a] | Surfactant conc. in w./v.% (I.C.)[b] | Emulsion instability in caustic | pH[c] after acidification | Emulsion instability after acidification | (A) percent of I.C. of surfactant in aqueous | (B) percent of I.C. of surfactant in toluene | (A)+(B)[d] |
|---|---|---|---|---|---|---|---|---|
| 1 | 10.0 | 0.5 | 36 | 3–4 | 102 | 98 | 3 | 101 |
| 2 | 12.6 | 0.5 | 35 | | 102 | | | |
| 3 | 15.0 | 0.05 | 98 | 3.6 | 100 | (e) | 7 | (e) |
| 4 | 15.0 | 0.5 | 22 | 2–3 | 100 | 100 | <1 | 100 |
| 5 | 15.0 | 5.0 | 18 | 4 | 101 | 89 | 0 | 89 |
| 6 | 20.0 | 0.5 | 32 | 2.1 | 101 | 98 | 1 | 99 |
| 7 | 20 | 20.0 | 0 | 1.5 | 103 | 101 | 1 | 102 |
| 8 | 30.0 | 0.5 | 30 | 2–5 | 103 | 101 | 3 | 104 |
| 9 | 3 | 0.5 | 61 | 4 | 101 | 78 | 42 | 120 |
| 10 | 15 | 0.5 | 61 | 3.0 | 101 | 96 | 2 | 98 |
| 11 | 20 | 0.5 | 14 | 2.8 | 71 | 94 | 2 | 96 |

[a] "n"=number of units of ethylene oxide, including the ethanol termination, in the polyether chain.
[b] "I.C."=initial concentration of surfactant expressed as weight/volume percent.
[c] A single result such as 3 or 3.0 denotes that all of the data were taken for this one pair of emulsions. Where a range is indicated, such as 2–4, one of them (the 2 or the 4) was a repeat. The figures not reported to a tenht of a pH unit were determined by using pH test papers; the other figures were obtained with a pH meter.
[d] (A)+(B) should equal 100 percent for complete accountability of the surfactant.
[e] Result obtained was greater than 100 percent due to limitations of method of analysis caused by the low concentration of the surfactant.

NOTES ON TABLE 1

(1) Surfactants Nos. 1–8 were ethylene oxide adducts of a commercial product comprising a mixture of amines which principally covers the range of $C_{11}H_{23}NH_2$ to $C_{16}H_{33}NH_2$, the number of ethylene oxide units per amine being from 10 to 30.
(2) Surfactants Nos. 9–10 were each the sodium salt of the sulfated ethylene oxide adducts of the type referred to in note (1) above.
(3) Surfactant No. 11 was a commercially available product, a dehydroabietylamine ethylene oxide adduct with the structure

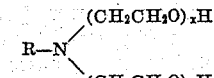

in which $x+y=20$.

Whereas Table 1 contains data comparing various surfactants used in an emulsification-demulsification system in which only toluene was employed, Table 2 which follows compared surfactants in the process as applied to various other oils.

Table 2
EMULSIFIED IN CAUSTIC, BROKEN WITH ACID; SURFACTANT RECOVERED IN AQUEOUS PHASE
Organic phase: Various Oils Listed
Aqueous phase: Surfactant, 0.5% NaOH, deionized $H_2O$

| Surfactant | Mole ratio of EO (n) (a) | Surfactant conc. in w./v.% (I.C.) (b) | Oil used | Emulsion instability in caustic | pH (c) after acidification | Emulsion instability after acidification | Percent of I.C of surfactant in aqueous |
|---|---|---|---|---|---|---|---|
| 1 | 12.6 | 0.5 | Ventura crude oil. | 56 | 6.6 | 90 | |
| 2 | 15.0 | 0.05 | ---do--- | 4 | 3-4 | 96 | (e) |
| 3 | 15.0 | 0.5 | ---do--- | 44 | 3.4 | 98 | 99 |
| 4 | 15.0 | 5.0 | ---do--- | 8 | 3.0 | 100 | 93 |
| 5 | 20.0 | 0.5 | ---do--- | 40 | 4.0-5.5 | 101 | (d) |
| 6 | 20.0 | 20.0 | ---do--- | 0 | 1.4 | 95 | 99 |
| 7 | 30.0 | 0.5 | ---do--- | 40 | 2.4-4 | 100 | (d) |
| 8 | 15 | 0.5 | ---do--- | 22 | 4.0 | 75 | (d) |
| 9 | 15 | 0.5 | ---do--- | 54 | 2.6 | 100 | (d) |
| 10 | 25 | 0.5 | ---do--- | 62 | 2.5 | 96 | (d) |
| 11 | 15 | 0.5 | ---do--- | 44 | 2.9 | 100 | (d) |
| 12 | 50 | 0.5 | ---do--- | 60-70 | 2 | 93 | (d) |
| 13 | 20 | 0.5 | ---do--- | 46 | 2.6 | 98 | (d) |
| 14 | 15 | 0.5 | How. Glas. | 59 | 2-3 | >99 | 9J |
| 15 | 15 | 0.5 | Hawk. field | 53 | 2-3 | >97 | 89 |
| 16 | 20 | 0.5 | Wesson oil | 79 | 2 | 100 | |
| 17 | 20 | 5.0 | ---do--- | 50 | 2 | 94 | 98 |
| 18 | 20 | 0.5 | Mixture of lauryl and myristyl alcohols. | 0 | 2.1 | 0-32 | | a Same as note (a) in Table 1.
b Same as note (b) in Table 1.
c Same as note (c) in Table 1.
d The Ventura crude oil contains some impurities which were extracted into the aqueous phase in some instances.
e Same as note (e) in Table 1.

NOTES ON TABLE 2

(1) Surfactants Nos. 1-7 and 14-17 were the same as described in note (1) in Table 1.
(2) Surfactant No. 8 was the same as described in note (2) in Table 1.
(3) Surfactants Nos. 9-10 were ethylene oxide adducts of a mixture of amines which principally covers the range of $C_{17-24}H_{35-49}NH_2$ where the number of ethylene oxide units per amine is 15 and 25, respectively.
(4) Surfactants Nos. 11-12 were a coco-amine ethylene oxide adduct, and a stearyl-amine ethylene oxide adduct, respectively. The former's structure is

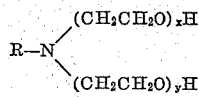

in which $x+y=15$; the latter has the same structure except that $x+y=50$.
(5) Surfactant No. 13 was a commercially available product, a dehydroabietylamine ethylene oxide adduct with the structure

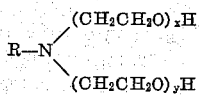

in which $x+y=20$.
(6) Surfactant No. 18 was sodium p-t-octylphenoxypolyethoxy (20 units) acetate with the structure

Table 3
EMULSIFIED IN CAUSTIC, BROKEN WITH ACID; SURFACTANT RECOVERED AS PRECIPITATE Organic phase: Toluene (except for item marked by asterisk in which Ventura crude oil was used)
Aqueous phase: 0.5% surfactant, 0.5% NaOH, deionized water

| Surfactant | Emulsion instability in caustic | Material added | Emulsion instability after acidification | pH after acidification | Percent of I.C.a in aqueous | Percent of I.C. in toluene | Percent of I.C. which precipitated |
|---|---|---|---|---|---|---|---|
| 1 | 70 | $H_2SO_4$ | 100 | 2.1 | 14 | 14 | 107 |
| 2 | 77 | $H_2SO_4$ | 100 | 2.4 | 29 | 29 | 51 |
| 3 | | $H_2SO_4$ | ca. 100 | 4.0 | 12 | | 94 |
| 4* | 22 | $H_2SO_4$ | 92 | <4 | (b) | | | a Same as note (a) in Table 1.  b Same as note (d) in Table 2.

NOTES ON TABLE 3

(1) Surfactant No. 1 was disodium β-tallow iminodipropionate.
(2) Surfactant No. 2 was disodium β-lauryl iminodipropionate.
(3) Surfactants Nos. 3 and 4 were sodium β-coco aminopropionate.

Table 4

EMULSIFIED IN ACID, BROKEN WITH BASE; SURFACTANT RECOVERED IN AQUEOUS OR ORGANIC PHASES

Organic phase: Toluene (except for items marked by asterisk in which Ventura crude oil was used)
Aqueous phase: 0.5% surfactant, 0.5% $H_2SO_4$, deionized water (all pH's: 1-2)

| Surfactant | Mole ratio of EO (n) | Emulsion instability in acid | Material added | Emulsion instability after adding material | pH after adding material | Percent of I.C.[a] in aqueous | Percent of I.C. in toluene |
|---|---|---|---|---|---|---|---|
| 1 | 5 | 100 | NaOH | 78 | 11.4 | 23 | --- |
| 2* | 5 | 0 | NaOH | --- | 11.4 | 4 | 90 |
| 3 | 5 | 100 | NaOH | 100 | 13.2 | 30 | --- |
| 4* | 5 | 0 | NaOH | --- | --- | --- | --- |
| 5 | 7.5 | 100 | NaOH | --- | --- | --- | --- |
| 6* | 7.5 | 0 | NaOH | 82 | 11.6 | 48 | --- |
| 7 | 20 | 9 | NaOH | 25 | 10 | --- | --- |
| 8 | 20 | 48 | NaOH | 83 | 13.3 | --- | --- |
| 9 | 12 | 18 | NaOH | 102 | 12.7 | 108 | 18 |

[a] Same as note (b) in Table I.

NOTES ON TABLE 4

(1) The results with surfactants 1-6 inclusive show the different effects with different oils. Note that with Ventura crude the same surfactant that worked well in Nos. 2 and 4 did not work at all with toluene in Nos. 1 and 3. Similarly, with Ventura crude in No. 6, a good result was obtained, but in No. 5 toluene did not work at all.
(2) Surfactants Nos. 1-6 were the same as described in note (1) in Table 1.
(3) Surfactants Nos. 7-8 were the same as described in note (6) in Table 2.
(4) Surfactant No. 9 was sodium N-polyethoxy (11 units) ethyldodecenylsuccinamate.

In the examples shown in Tables 1 to 4, the number of units of ethylene oxide employed in the amine-EO adducts therein specified ranged from 10-30 in some cases and from 15-50 in others. Actually, these are merely illustrative. It is possible to use compounds having from about 5 to about 100 units per amine group, depending upon the particular oil and water combination of interest.

EXAMPLES OF PROCESS EMPLOYING CONTINUOUS CYCLES

From the foregoing tables, it was apparent that among the surfactants which may be employed in the inventive process, one of the most successful types is the group comprising a number of amine-ethylene oxide adducts. Of these, the products, identified as an ethylene oxide adduct (15-30 units) of a commercial product comprising a mixture of amines which principally covers the range $T\text{-}C_{11}H_{23}NH_2$ to $T\text{-}C_{14}H_{29}NH_2$ excelled all other surfactants tested in several oil-water systems when consideration was given to emulsion stability in caustic solution, efficiency (time and completeness) of breaking, and recoverability of the surfactant. One of them (the one having 15 units of ethylene oxide) was therefore selected for a series of recycling experiments in which the same batch of caustic-surfactant solution was used repeatedly to form the emulsion, then reclaimed, freed of most of the inorganic salt, and used again to emulsify a fresh batch of the same oil. The number of cycles in each experiment was limited only by the fact that the volume of emulsion was constantly being decreased as samples were removed for determination of emulsion stability in caustic solution and for analysis. This type of limitation will vary, depending upon the scale on which my invention is practiced, any samples needed during the process, etc., if no make-up surfactant is used.

The results obtained with the recycling process are set forth in Tables 5-8. They were obtained by the following procedure:

Equal volumes of oil and of a 0.5 percent caustic-0.5 percent surfactant solution (500 cc. of each phase at the start) were vigorously mixed by a mechanical shaker for 15 minutes. A control sample of the emulsion was withdrawn for measuring emulsion stability in caustic, allowed to stand for an hour, and the phase volumes read. The remaining emulsion was poured into a graduated separatory funnel and dilute $H_2SO_4$ added until the emulsion broke and the pH was below 5, shaking well after adding each increment. The completeness of breaking (i.e., percent recovery of oil) was determined.

A sample of the aqueous phase (and of the organic phase in the case of toluene) was withdrawn and analyzed for surfactant. An amount of $Ca(OH)_2$ equivalent to the $H_2SO_4$ present was added to the solution. The solution was shaken for a few minutes, then filtered to remove the precipitate. A sufficient amount of NaOH was then added to raise the pH to that of the starting solution, viz., 12.8-12.9.

Failure to remove $CaSO_4$ prior to replenishing caustic would result in the redissolving of some $CaSO_4$, and such removal is therefore preferable. (If other alkaline materials are used in lieu of the $Ca(OH)_2$, this problem does not occur. Optionally, also, HCl [or any other inorganic acid, or organic acid, or acid salts] could be used instead of $H_2SO_4$, and other alkaline materials can also be used. The HCl and NaOH will form NaCl which can be allowed to accumulate or may be removed by some other means without interfering with the process.) The $Ca(OH)_2$ precipitated by the NaOH was eliminated by refiltration. The volume of the filtrate was measured and an equal volume of fresh oil added thereto, after which all of the foregoing steps were repeated a number of times as shown in Tables 5-8.

Tables 5-8 set forth data obtained when the cyclic process was applied to each of four different oils, using one of the preferred surfactants (the one having 15 units of ethylene oxide as an adduct of $T\text{-}C_{11-14}H_{23-29}NH_2$), as aforesaid.

Table 5
TOLUENE

| Cycle No. | Emulsion instability in Control | pH after acidification | Emulsion instability after acidification | Percent of I.C.[a] in $H_2O$ | Cumulative percent of I.C. | Percent of I.C. in toluene | Cumulative percent of I.C. in toluene |
|---|---|---|---|---|---|---|---|
| 0 | 40 | 2.9 | (100) | (102.5) | (102.5) | (0.6) | (0.6) |
| 1 | 51 | 2.1 | 101 | 99.8 | 102.2 | 0 | 0.6 |
| 2 | 39 | 2.6 | 100 | 98.0 | 100.2 | 0 | 0.6 |
| 3 | 28 | 2.2 | 100 | 98.5 | 98.7 | 0.6 | 1.2 |
| 4 | 50 | 2.4 | 100 | 100.8 | 99.4 | 3.8 | 5.0 |
| 5 | 50 | 2.8 | | 97.6 | 97.0 | 0.6 | 5.7 |
| 6 | 49 | 2.7 | 101 | 101.0 | 98.0 | −0.7 | 5.0 |
| 7 | 64 | 2.2 | 102 | 100.0 | 98.0 | 2.9 | 7.8 |

[a] "I.C." is initial concentration.

Table 6
VENTURA CRUDE OIL

| Cycle No. | Emulsion instability in control | pH after acidification | Percent of I.C.[a] in $H_2O$ | Cumulative percent of I.C. |
|---|---|---|---|---|
| 0 | 52 | 3.5 | (99) | (99) |
| 1 | 0 | 2 | 90 | 90 |
| 2 | 76 | 2 | 109 | 98 |
| 3 | 4 | 2 | 82 | 80 |
| 4 | 32 | | | |

[a] "I.C." is initial concentration.

Table 7
HOWARD GLASSCOCK CRUDE OIL

| Cycle No. | Emulsion instability in control | pH after acidification | Emulsion instability after acidification | Percent of I.C.[a] in $H_2O$ | Cumulative percent of I.C. |
|---|---|---|---|---|---|
| 0 | 64 | 3.0 | (96) | (96) | (96) |
| 1 | 96 | 2.8 | 100 | 99 | 95 |
| 2 | 0 | 3.4 | 80 | 99 | 94 |
| 3 | 88 | 3.0 | 91 | 100 | 94 |
| 4 | 72 | 2.8 | 94 | 90 | 85 |
| 5 | 54 | 2.7 | 94 | 93 | 79 |
| 6 | 94 | 2.8 | 100 | 93 | 74 |

[a] "I.C." is initial concentration.

Table 8
HAWKINS FIELD CRUDE OIL

| Cycle No. | Emulsion instability in control | pH after acidification | Emulsion instability after acidification | Percent of I.C.[a] in $H_2O$ | Cumulative percent of I.C. |
|---|---|---|---|---|---|
| 0 | 30 | 3.1 | (93) | (89) | (89) |
| 1 | 84 | 3.1 | 95 | 89 | 79 |
| 2 | 63 | 2.5 | 97 | 90 | 71 |
| 3 | 63 | 2.3 | 89 | 89 | 63 |
| 4 | 46 | 2.5 | 87 | 91 | 57 |
| 5 | 100 | 2.7 | 99 | 98 | 56 |
| 6 | 60 | 2.7 | 82 | 90 | 50 |
| 7 | 50 | 2.4 | 88 | 94 | 47 |

[a] "I.C." is initial concentration.

Some of the more salient points reflected by the recycling data in Tables 5–8 may be summarized as follows.

Average percent recovery of aqueous phase after acidification:

```
Toluene _____ 100
Ventura _____  95
Glasscock _____  94
Hawkins _____  91
```

Percent recovery of organic phase after acidification:

Toluene _____ 100.
Ventura, Glasscock, Hawkins _____ In nearly all cases, the volume of black upper phase was a little greater than the volume of pure oil available. The interface was not discernible, so the exact percentages of pure oil and water-in-oil emulsion could not be determined.

Average percent recovery of surfactant into aqueous phase:

```
Toluene _____ 100
Ventura _____  94
Glasscock _____  94
Hawkins _____  91
```

CONCLUSIONS AND OBSERVATIONS

The foregoing description has clearly demonstrated the efficient manner in which my invention can be employed to emulsify and demulsify oils, and provide for the reclamation and reuse of the emulsifying agent. This is done either by adding to the oil a base in a surfactant solution and then breaking the emulsion by adding acid, or by adding acid in a surfactant solution and breaking the emulsion by adding a base. The applications of the invention are manifold, whether employed in a single cycle or a continuous processing operation.

Mention has been made of the practice of the invention in connection with the recovery of oil. Such oil recovery, which in itself is not new, is practiced in a number of ways. One common practice involves the drilling of adjacent holes deep into the ground, then injecting a flushing material into one hole to force the oil out of another. In the past, water containing a surfactant has been used for this flushing operation. It is understood that a more recent development involves the use of a mixture of a surfactant such as a t-octylphenol ethylene oxide adduct and a caustic solution. The principal purpose of this flushing procedure has been to emulsify oils which were contained in petroleum producing formations, and the like, which could not be broken loose and flushed out by pre-existing procedures. But the method has thus far not proven to be commercially acceptable because it has been difficult and expensive to break the emulsion thus formed, and the surfactant has not been recoverable. My invention has overcome this objection and now makes it possible to employ this efficient and economical technique for the recovery of many billions of gallons of oil that heretofore were relatively inaccessible from a commercial standpoint.

It will be apparent to most chemists that the invention can be applied to numerous other situations where it is necessary to emulsify and demulsify oils and it is desired to recover the surfactants used in accomplishing the emulsification. To illustrate, it can be used in the degreasing of animal hides. The greasy, pickled hides are washed in an aqueous solution of a surfactant such as $$t\text{-}C_{11\text{-}14}H_{23\text{-}29}NH_2(EO)_{15\text{-}30}$$

plus NaCl, plus $Na_2CO_3$. The emulsion which results is acidified, causing it to break. The grease and surfactants are each recovered in their respective, separate phases which are formed thereby.

Likewise, the invention could be applied to fracturing gels. The function of such a gel is to serve as a vehicle for sand, the resulting slurry being used to "fracture" or porifiorate rigid silicious oil-bearing formations. After fracturing formation, the presence of the gel is no longer desired. The gel may be formed by the use of an emulsifier such as $t\text{-}C_{11\text{-}14}H_{23\text{-}29}NH_2(EO)_{15\text{-}30}$, containing a "built-in" emulsion breaker such as benzotrichloride which decomposes slowly to liberate HCl. The acid eventually lowers the pH of the solution to the point where it causes the gel to break.

Still another application would be to clean out the holds of oil tankers, etc. The oil and tars remaining in the holds could be emulsified by pumping in the caustic-surfactant solution, then acidified in situ (or after transferring the emulsion to another hold) to break the emulsion and make recovery of the surfactant possible.

A further application would be in the preparation of rapid-breaking asphalt emulsions. In this use, of course, recovery of the surfactant is not contemplated; but the ease and speed of emulsion-breaking made possible by the invention are the main factors which favor its use.

A still further application is in connection with destructible foaming agents for air drilling. In such cases, the surfactants would be recoverable.

It is obvious, therefore, that the possible applications of my invention are widespread. It is thus appropriate that the invention should not be limited in its scope to just the few examples and other data given hereinabove but instead should be construed in the light of the claims which follow.

I claim:
1. A cyclic process for emulsifying an oil-water system and reusing the emulsifying agent in the process, which comprises the steps of emulsifying an oil under alkaline conditions by the addition of a pH-sensitive surfactant and water thereto, said surfactant being selected from the class consisting of:
(a) the ethylene oxide adducts of a range of amines represented by the formula $C_{11\text{-}24}H_{23\text{-}49}NH_2$ where the number of ethylene oxide units is from 5 to 50 per amine;
(b) $C_{11\text{-}24}H_{23\text{-}49}NH(C_2H_4O)_nSO_4Na$ where $n=3$ to 50; and
(c)

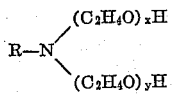

in which R is a dehydroabietyl group and $x+y=15$ to 50,
and subsequently breaking the emulsion by addition of an acidic substance so as to make the oil-water system acidic to thereby concentrate the surfactant in a bulk phase, and recycling said bulk phase in said process so as to emulsify more oil as aforesaid.

2. A cyclic process for emulsifying an oil-water system and reusing the emulsifying agent in the process, which comprises the steps of emulsifying an oil under acid conditions by the addition of a pH-sensitive surfactant and water thereto, said surfactant being selected from the class consisting of:
(a) the ethylene oxide adducts of a range of amines represented by the formula $C_{11\text{-}24}H_{23\text{-}49}NH_2$ where the number of ethylene oxide units is from 5 to 50 per amine;
(b) $C_{11\text{-}24}H_{23\text{-}49}NH(C_2H_4O)_nSO_4Na$ where $n=3$ to 50; and
(c)

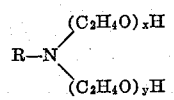

in which R is a dehydroabietyl group and $x+y=15$ to 50,
and subsequently breaking the emulsion by addition of an alkaline substance so as to make the oil-water system alkaline to thereby concentrate the surfactant in a bulk phase, and recycling said bulk phase in said process so as to emulsify more oil as aforesaid.

References Cited in the file of this patent
UNITED STATES PATENTS

| | | |
|---|---|---|
| 2,215,624 | Strezynski | Sept. 24, 1940 |
| 2,270,411 | Campbell | Jan. 20, 1942 |
| 2,296,459 | Schutte | Sept. 22, 1942 |
| 2,354,856 | Erwin | Aug. 1, 1944 |
| 2,605,272 | Hunn et al. | July 29, 1952 |
| 2,662,062 | Sumerford | Dec. 8, 1953 |
| 2,784,161 | Foley | Mar. 5, 1957 |
| 2,800,962 | Garst | July 30, 1957 |
| 2,802,785 | Nowak | Aug. 13, 1957 |
| 2,874,779 | Johnson | Feb. 24, 1959 |
| 2,882,973 | Doscher et al. | Apr. 21, 1959 |

OTHER REFERENCES

"The Chemistry of Fatty Amines," published by Armour and Co., 1948, pp. 1–5, 17 and 18.